UNITED STATES PATENT OFFICE.

AUGUSTE FERNBACH, OF PARIS, FRANCE, AND EDWARD HALFORD STRANGE, OF STAPLE INN, LONDON, ENGLAND.

FERMENTATION PROCESS FOR THE PRODUCTION OF ACETONE AND HIGHER ALCOHOLS FROM STARCH, SUGARS, AND OTHER CARBOHYDRATE MATERIAL.

1,044,368. Specification of Letters Patent. Patented Nov. 12, 1912.

No Drawing. Application filed September 24, 1912. Serial No. 722,120.

*To all whom it may concern:*

Be it known that we, AUGUSTE FERNBACH, a citizen of the Republic of France, of 26 Rue Dutot, Paris, in the Republic of France, and EDWARD HALFORD STRANGE, a subject of the King of Great Britain and Ireland, of 7 Staple Inn, in the county of London, England, have invented new and useful improvements connected with fermentation processes for the production of acetone and higher alcohols from starch, sugars, and other carbohydrate materials, of which the following is a specification.

The object of our invention is to manufacture acetone, and higher alcohols, for example propyl, amyl and normal butyl alcohols, from carbohydrate materials in a very economical and efficient manner, and with a good yield, and to enable the process to be carried on as a continuous process for a considerable time, if so desired.

According to our invention we take carbohydrate material, such for instance as maize, potatoes, glucose, or the substances obtained from woody matter by treatment with superheated steam, or acids, (or mixtures of such matters) and make a mash thereof with a large quantity of water, and we sterilize the said mash, which may be done by heating to a temperature of, or about, 130° centigrade. We also add (before, or after, sterilizing) a small quantity of yeast, degraded as hereinafter described, either by the action of a ferment such as *Tyrothrix tenuis* (see *System Der Bacterien;* Dr. W. Migula, Jena, 1900, page 587), in the presence of sterilized air, or by means of steam, or of water heated under pressure. The mixture may then be maintained at an elevated temperature for some time, and, after cooling, a ferment of the type of the butylic bacillus of Fitz is added, care being taken that air does not have access to the mixture during fermentation and the proper fermentation temperature being maintained until the fermentation is complete, and then the mass is subjected to distillation and the products of distillation obtained (consisting principally of water, acetone, and higher alcohols) can be separated from one another by fractional distillation, or other suitable means.

The degraded yeast hereinbefore referred to is made from yeast (such for instance as yeast remaining from processes of fermentation) by mixing it with water and sterilizing it, which can be done by subjecting it to a sufficiently high temperature for some time, and then the mixture is cooled and a ferment of the type of *Tyrothrix tenuis* is added, sterilized air being allowed to have access to the mixture during, or at intervals during, the period of fermentation.

At the end of the fermentation it has been found that about ninety per cent. of the nitrogenous matter of the yeast has been converted into a soluble form not precipitatable by tannin. In place of degrading the yeast by means of the ferment referred to, it may be degraded by means of steam, or by water heated under pressure.

It is found advantageous to conduct the fermentation in a closed vessel connected with an exhausting device and a condenser, the exhausting device being operated so as to obtain such a reduction of pressure as will remove from the fermentation vessel all, or most, of the substances which have volatilized with water vapor at the temperature of fermentation, and by this means the process can be carried on for a continuous period if the fermentation vessel be provided with means for supplying sterilized water and the substances to be fermented, and also the aforesaid degraded yeast. The said reduction of pressure by the exhausting device may for instance, with a watery mash, at a temperature of from 30° to 40°, centigrade, be a reduction corresponding to less than six inches of mercury absolute, in the absence of any considerable evolution of gases. If gases be present to any considerable extent, so high a vacuum may not be necessary.

If desired, any gaseous matter, as distinguished from the condensable vapors, can be absorbed by alkali, or other chemical agent which will combine with the said gaseous matter before the vapors reach the condenser, for instance $CO_2$ can be absorbed by passing the gases and vapors through soda lye, or milk of lime.

Although we have hereinbefore described the conjoint use of the aforesaid degraded yeast and reduction of pressure in conducting the fermentation under the action of a ferment of the character of the butylic bacillus of Fitz (see *Deutsche Chemische*

*Gesellschaft Berichte*, 1878 Jahrg. 11, vol. 1, pages 42 to 55) in the absence of air, in some cases either the degraded yeast, or the reduction of pressure, can be dispensed with.

Working under the aforesaid conditions it is possible to convert as much as from 33 to 50 per cent. of the carbohydrate employed into a mixture of acetone and higher alcohols in the proportion of approximately two parts of higher alcohols to one part of acetone.

The following are examples of the way in which our invention can be performed, but we do not limit ourselves to these examples.

*Preparation of degraded yeast suitable for use in the process.*

Example 1: 100 pounds of pressed yeast are mixed with 1,000 pounds of water, and the mixture is sterilized by heat, employing a temperature of, say, about 130° centigrade during several hours. The mixture is then cooled, preferably to a temperature of from 30° to 35° centigrade, and a ferment of the type *Tyrothrix tenuis* is added, in the presence of sterilized air, care being taken that no other ferment obtains access to the mixture. The mixture is maintained preferably at from 30° to 35° centigrade for from four, to five, weeks, sterilized air being admitted, say at intervals of 24 hours. By the end of the four or five weeks, about ninety per cent. of the nitrogenous content of the mixture is converted into compounds which are not capable of being precipitated by tannin.

Example 2: 100 lbs. of pressed yeast and 1,000 lbs. of water are subjected to a temperature of about 150° centigrade for 24 hours, or until a sufficient proportion of the nitrogenous matter of the yeast has been converted into a form not capable of being precipitated by tannin. Acids, or alkalis, may be added to facilitate the conversion, but any acid, or alkali, remaining at the end of the treatment must then be neutralized.

The following is an example of how the fermentation under the action of a ferment such as the butylic bacillus of Fitz in accordance with this invention can be carried out, using the aforesaid degraded yeast as well as reduced pressure, although, as aforesaid, either can be used without the other.

Example 3: Twenty-five pounds of potato meal are mixed with one thousand pounds of water in a closed vessel connected with an exhausting apparatus and a condenser and to this mixture we add a quantity of the aforesaid degraded yeast such as contains half a pound of soluble nitrogenous matter not capable of precipitation by tannin. The mixture is then boiled for four hours at a pressure of 130 pounds and the temperature is then reduced to from 30° to 35° centigrade, and we then add a ferment of the type of the butylic bacillus of Fitz, care being taken that, during fermentation, air does not have access to the mixture. The exhausting apparatus is operated so as to reduce the pressure in the fermenting vessel to such a degree that acetone, higher alcohols, and water vapor will be withdrawn and passed to the condenser.

What we claim is:

1. The process of obtaining acetone and higher alcohols which consists in mixing carbohydrate matter with water, sterilizing the mixture, adding a ferment of the type of the butylic bacillus of Fitz and then subjecting the mixture to fermentation in the absence of air and leading off and condensing the vapors as they are formed.

2. The process of obtaining acetone and higher alcohols which consists in mixing carbohydrate matter with water, sterilizing the mixture, adding a ferment of the type of the butylic bacillus of Fitz and then subjecting the mixture to fermentation in the absence of air, while withdrawing vapors as they are produced.

3. The process of obtaining acetone and higher alcohols which consists in mixing carbohydrate matter with water, sterilizing the mixture, adding a ferment of the type of the butylic bacillus of Fitz and then subjecting the mixture to fermentation in the absence of air, while withdrawing vapors as they are produced and absorbing the gases before the vapors pass to the condenser.

4. The process of obtaining acetone and higher alcohols which consists in mixing carbohydrate matter with water, adding thereto a suitably degraded yeast, sterilizing the mixture, adding a ferment of the type of the butylic bacillus of Fitz and then subjecting the mixture to fermentation in the absence of air.

5. The process of obtaining acetone and higher alcohols which consists in mixing carbohydrate matter with water, adding thereto a suitably degraded yeast, sterilizing the mixture, adding a ferment of the type of the butylic bacillus of Fitz and then subjecting the mixture to fermentation in the absence of air while withdrawing vapors as they are produced.

6. The process of obtaining acetone and higher alcohols which consists in mixing carbohydrate matter with water, adding thereto a suitably degraded yeast, sterilizing the mixture, adding a ferment of the type of the butylic bacillus of Fitz and then subjecting the mixture to fermentation in the absence of air, while withdrawing vapors as they are produced and absorbing the gases before the vapors pass to the condenser.

7. The process of obtaining acetone and higher alcohols which consists in mixing carbohydrate matter with water, adding thereto a yeast degraded by the action of a ferment of the type of *Tyrothrix tenuis*, sterilizing the mixture, adding a ferment of the type of the butylic bacillus of Fitz and then subjecting the mixture to fermentation in the absence of air.

8. The process of obtaining acetone and higher alcohols which consists in mixing carbohydrate matter with water, adding thereto a yeast degraded by the action of a ferment of the type of *Tyrothrix tenuis*, sterilizing the mixture, adding a ferment of the type of the butylic bacillus of Fitz and then subjecting the mixture to fermentation in the absence of air, while withdrawing vapors as they are produced.

9. The process of obtaining acetone and higher alcohols which consists in mixing carbohydrate matter with water, adding thereto a yeast degraded by the action of a ferment of the type of *Tyrothrix tenuis*, sterilizing the mixture, adding a ferment of the type of the butylic bacillus of Fitz and then subjecting the mixture to fermentation in the absence of air, while withdrawing vapors as they are produced and absorbing the gases before the vapors pass to the condenser.

In testimony whereof we have signed our names to this specification in the presence of two subscribing witnesses.

AUGUSTE FERNBACH.
EDWARD HALFORD STRANGE.

Witnesses:
    LUCIEN MEMMINGER,
    JACK H. BATEMAN.